United States Patent
Shin et al.

(10) Patent No.: US 11,074,066 B2
(45) Date of Patent: Jul. 27, 2021

(54) APPARATUS AND METHOD FOR MANAGING SOFTWARE UPDATES OF ELECTRONIC DEVICES

(71) Applicant: Samsung Electronics Co., Ltd., Suwon-si (KR)

(72) Inventors: Kyoung Heun Shin, Seongnam-si (KR); Junha Kim, Seongnam-si (KR); Tae Hun Lee, Seoul (KR); Tae Yoon Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/648,949

(22) PCT Filed: Sep. 17, 2018

(86) PCT No.: PCT/KR2018/010884
§ 371 (c)(1),
(2) Date: Mar. 19, 2020

(87) PCT Pub. No.: WO2019/059596
PCT Pub. Date: Mar. 28, 2019

(65) Prior Publication Data
US 2020/0249938 A1    Aug. 6, 2020

(30) Foreign Application Priority Data

Sep. 19, 2017  (KR) .......................... 10-2017-0120483

(51) Int. Cl.
*G06F 9/445* (2018.01)
*G06F 9/44* (2018.01)
*H04L 29/08* (2006.01)
*G06F 8/65* (2018.01)
*G06F 8/71* (2018.01)

(52) U.S. Cl.
CPC . *G06F 8/71* (2013.01); *G06F 8/65* (2013.01)

(58) Field of Classification Search
CPC ..... G06F 8/61; G06F 8/65; G06F 8/63; G06F 8/60; G06F 8/71; G06F 8/658;
(Continued)

(56) References Cited

U.S. PATENT DOCUMENTS

| 6,735,757 | B1 * | 5/2004 | Kroening | G06F 8/63 |
| | | | | 717/120 |
| 8,245,218 | B2 | 8/2012 | Giambalvo et al. | |

(Continued)

FOREIGN PATENT DOCUMENTS

| JP | 2012-146241 A | 8/2012 |
| KR | 10-2007-0117804 A | 12/2007 |

(Continued)

OTHER PUBLICATIONS

Hosek et al., Safe software updates via multi-version execution, 10 pages (Year: 2013).*

*Primary Examiner* — Thuy Dao
(74) *Attorney, Agent, or Firm* — Jefferson IP Law, LLP

(57) ABSTRACT

Disclosed is a system including at least one network interface; at least one processor operatively connected to the at least one network interface; and at least one memory configured to store a plurality of versions of software updates for a group of mobile devices and operatively connected to the at least one processor, wherein the at least one memory stores instructions causing the at least one processor, when executed, to receive a request for providing a list of software updates from an external server through the at least one network interface, to generate the list of the software updates, the list including information on a plurality of versions of the software updates, to provide the list to the external server through the at least one network interface, to receive a request for providing a selected version of the software update from one of the mobile devices through the at least one network interface, and to provide the selected (Continued)

version of the software update to the one of the mobile devices through the at least one network interface, the selected version not being the latest version. Other embodiments are possible.

20 Claims, 12 Drawing Sheets

(58) Field of Classification Search
CPC .. G06F 11/3684; G06F 16/10; G06F 9/44536; H04L 67/34; H04L 67/12
See application file for complete search history.

(56) References Cited

U.S. PATENT DOCUMENTS

| | | | | |
|---|---|---|---|---|
| 2005/0144616 | A1* | 6/2005 | Hammond | G06F 8/65 717/173 |
| 2006/0174121 | A1 | 8/2006 | Omae et al. | |
| 2008/0148248 | A1* | 6/2008 | Volkmer | G06F 8/65 717/168 |
| 2011/0239208 | A1 | 9/2011 | Jung et al. | |
| 2011/0289495 | A1* | 11/2011 | Mulligan | G06F 8/61 717/168 |
| 2014/0173588 | A1 | 6/2014 | Ko | |
| 2014/0304699 | A1 | 10/2014 | He et al. | |
| 2014/0325500 | A1 | 10/2014 | Jang et al. | |
| 2015/0317145 | A1* | 11/2015 | Katariya | G06Q 10/10 717/173 |
| 2016/0191318 | A1* | 6/2016 | Neilson | G06F 8/00 709/220 |

FOREIGN PATENT DOCUMENTS

| | | |
|---|---|---|
| KR | 10-2011-0107579 A | 10/2011 |
| KR | 10-2014-0077435 A | 6/2014 |
| KR | 10-2014-0132019 A | 11/2014 |
| KR | 10-1553603 B1 | 10/2015 |

* cited by examiner

APPARATUS AND METHOD FOR MANAGING SOFTWARE UPDATES OF ELECTRONIC DEVICES

TECHNICAL FIELD

The present disclosure relates to an apparatus and a method for administering or controlling an update of software of an electronic device.

BACKGROUND ART

An electronic device may include various pieces of software provided from a server. In order to improve the function of software or correct found errors, the server may provide an update for some functions of the software. The electronic device may be connected to the server wirelessly or through a wire to apply the provided update. The electronic device may be connected to the server by receiving user input allowing the update. Through the connection to the server, the electronic device may receive update information to perform the update.

When the server provides update several times, the server may provide update information on the latest update version to the electronic device. Accordingly, the electronic device may perform the update of software with the latest version provided from the server.

DISCLOSURE OF INVENTION

Technical Problem

An electronic device having performed the update provided from a server may change functions related to software. Other software executed on the electronic device may conflict with updated software. For example, when firmware is upgraded, the electronic device may be configured to limit some functions thereof. In this case, the electronic device may not execute software that provides some limited functions.

According to various embodiments, it is possible to provide an apparatus and a method for providing, when a plurality of electronic devices exists, various versions of update to the plurality of electronic devices requiring the update.

Solution to Problem

In accordance with an aspect of the present disclosure, a system is provided. The system includes: at least one network interface; at least one processor operatively connected to the at least one network interface; and at least one memory configured to store a plurality of versions of software updates for a group of mobile devices and operatively connected to the at least one processor, wherein the at least one memory stores instructions causing the at least one processor, when executed, to receive a request for providing a list of software updates from an external server through the at least one network interface, to generate the list of the software updates, the list including information on a plurality of versions of the software updates, to provide the list to the external server through the at least one network interface, to receive a request for providing a selected version of the software update from one of the mobile devices through the at least one network interface, and to provide the selected version of the software update to the one of the mobile devices through the at least one network interface, the selected version not being the latest version. The selected version may not be the latest version.

In accordance with another aspect of the present disclosure, an electronic device is provided. The electronic device includes: a communication module; a memory configured to store instructions; and at least one processor, wherein the at least one processor is connected to the communication module and the memory and is configured to execute instructions stored to transmit information on an update list to a first external device in response to reception of a request of the update list from the first external device, the update list including information on at least one update version related to a second external device, and to transmit information for updating software of the second external device to the received update version in response to reception of a request for one update version included in the update list from the second external device.

In accordance with another aspect of the present disclosure, a method of an electronic device is provided. The method includes: transmitting information on an update list to a first external device in response to reception of a request of the update list from the first external device, the update list including information on at least one update version related to a second external device; and transmitting information for updating software of the second external device to the received update version in response to reception of a request for one update version included in the update list from the second external device.

Advantageous Effects of Invention

According to various embodiments of the present disclosure, it is possible to provide an apparatus and a method for identifying an update which can be used by an electronic device, providing information on the identified update, and providing the update to another electronic device in response to a request from the other electronic device related to the identified update.

According to various embodiments of the present disclosure, it is possible to provide an apparatus and a method for providing various versions of update to a plurality of groups on the basis of information on the plurality of electronic devices classified as the plurality of groups.

BEST MODE FOR CARRYING OUT THE INVENTION

Figure 1:
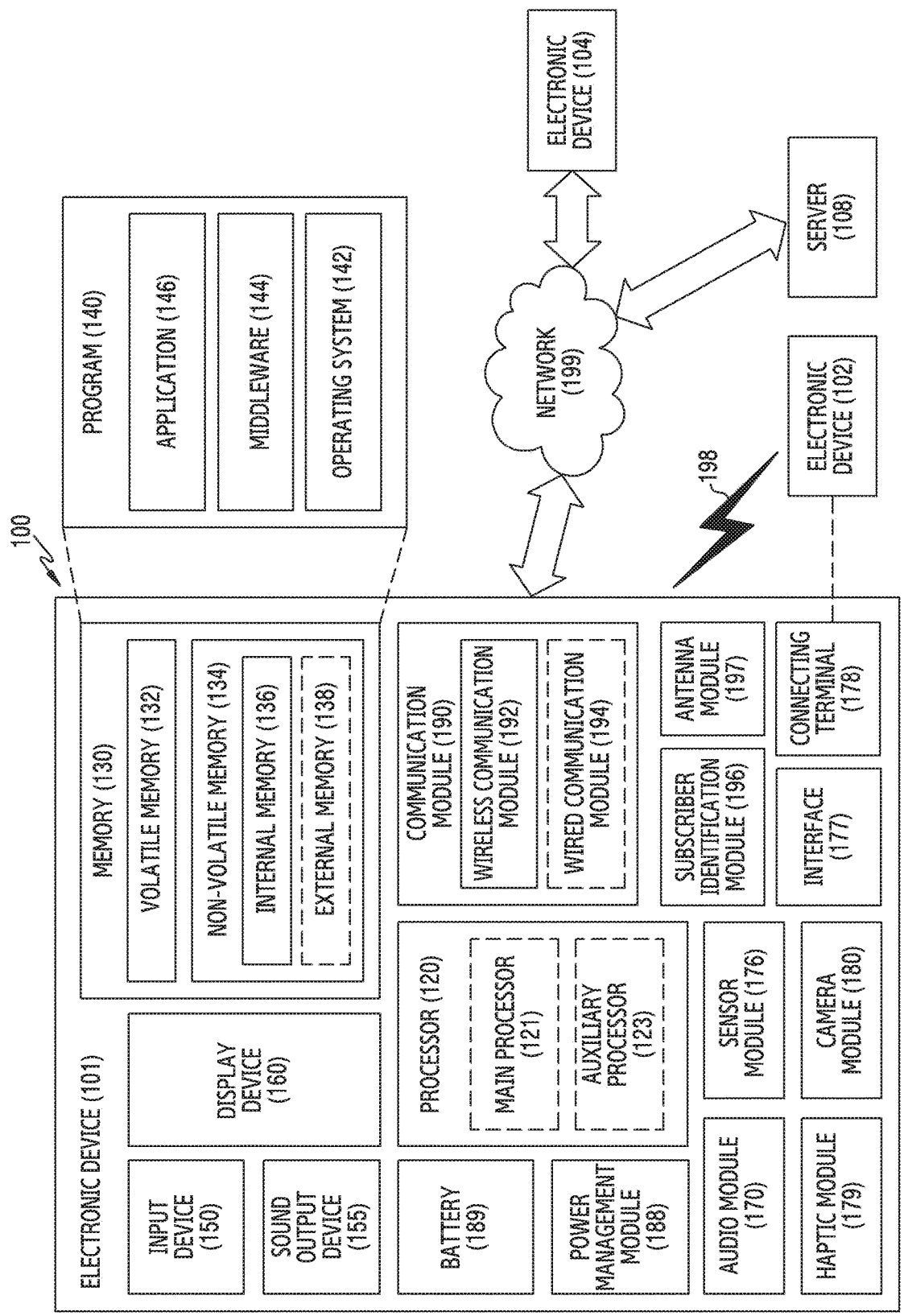
FIG. 1 is a block diagram illustrating an electronic device within a network environment according to various embodiments.

FIG. 1 is a block diagram illustrating an electronic device 101 in a network environment 100 according to various embodiments; Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other.

The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include a plurality of antennas. The module 190 (e.g., the wireless communication module 192) may transmit a signal to an external electronic device using an antenna suitable for a communication method, or receive a signal from the external electronic device.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
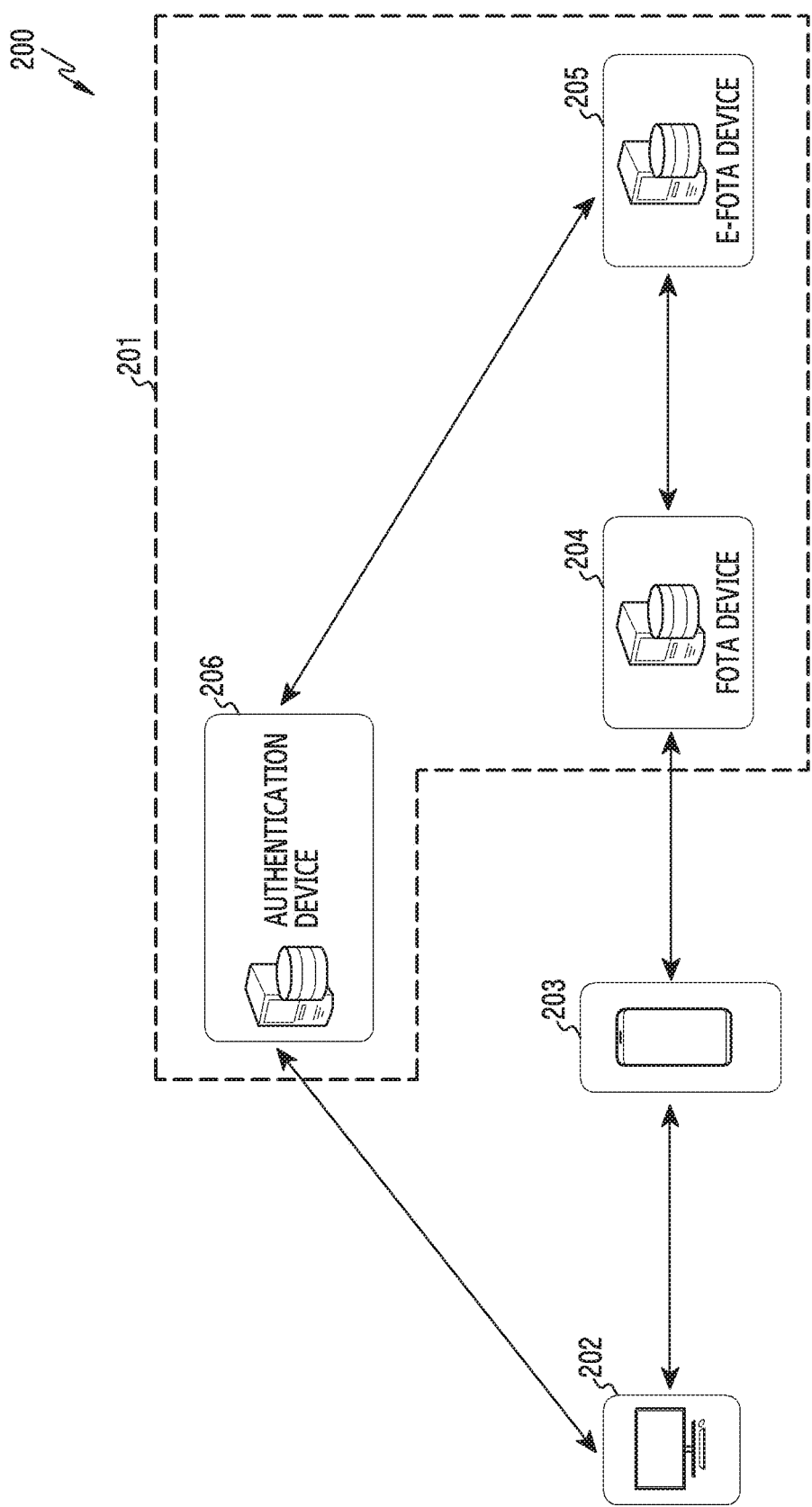
FIG. 2 illustrates an example of a network environment according to various embodiments.

FIG. 2 illustrates an example of a network environment according to various embodiments. The terms referring to an update used in the following description, the term referring to identification information, the terms referring to a user device, and the terms referring to a manager device are examples for convenience of description. Accordingly, the present disclosure is not limited to the following terms, and other terms having the same technical meaning may be used.

Referring to FIG. 2, a network environment 200 may include a server 201, a manager device 202, or a user device 203. According to an embodiment, the network environment 200 may further include other elements. According to various embodiments, at least one of the server 201, the manager device 202, and the user device 203 may correspond to the electronic device 101.

The server 201 according to various embodiments of the present disclosure may include a FOTA device 204, an E-FOTA device 205, and/or an authentication device 206. All of the FOTA device 204, the E-FOTA device 205, and/or the authentication device 206 may be included in the server 201, or respective servers for performing the functions of the FOTA device 204, the E-FOTA device 205, and/or the authentication device 206 may be configured. According to an embodiment, the server 201 may further include other elements.

The FOTA device 204 according to various embodiments of the present disclosure may provide a Firmware On The Air (FOTA) service. For example, the FOTA device 204 may be a server for providing a service through which firmware of the user device 203, an application, or software can be wirelessly updated. The FOTA device 204 may include update information for updating software. The update information may include data required for updating software. The update information may be provided from a manufacturer of the user device 203 or a server of software included in the user device 203. For example, the server of software may provide update information of the user device 203 by storing (or registering) the update information in the FOTA device 204. To this end, standard technology such as Open Mobile Alliance Device Management (OMA DM) or Firmware Update Management Object (FUMO) may be used. According to various embodiments, the FOTA device 204 may be referred to as a FOTA server or FOTA, but is not limited thereto.

The E-FOTA device 205 according to various embodiments of the present disclosure may provide an Enterprise-Firmware Over The Air (E-FOTA) service. For example, the E-FOTA device 205 may be a server for providing a service through which firmware of the user device 203 associated with an enterprise, an application, or software can be wirelessly updated. The E-FOTA device 205 may be connected to the FOTA device 204. The E-FOTA device 205 may be synchronized with (or transmit/receive stored information to/from) the FOTA device 204 through a real-time connection thereto. According to some embodiments, the E-FOTA device 205 may synchronize update information from the FOTA device 204. For example, the E-FOTA device 205 may receive update information stored in the FOTA device 204 from the FOTA device 204. According to other embodiments, the E-FOTA device 205 may receive information on a terminal included in the FOTA device 204 from the FOTA device 204. The information on the terminal may be information on the current version of software included in the terminal.

The E-FOTA device 205 may provide the E-FOTA device only to the registered manager device 202. The E-FOTA device 205 may register the manager device 202 by receiving a registration API from the authentication server 206. The E-FOTA device 205 may register (or store) identification information related to the manager device 202 in the E-FOTA device 205 in response to reception of a call made to the registration API. In response to the storage, the E-FOTA device 205 may register the manager device 202 as a device for providing the E-FOTA service. The E-FOTA device 205 may generate information corresponding to the registration API on the basis of the registration of the manager device 202. For example, the E-FOTA device 205 may generate a result of the registration API indicating that the manager device 202 is registered. The E-FOTA device 205 may transmit the generated information to the authentication device 206.

The authentication device 206 according to various embodiments of the present disclosure may include identification information for authenticating the manager device 202. The identification information may include an Identification (ID) (or a customer (cust) ID) of an enterprise using the E-FOTA device or an ID (or a Mobile Device Management (MDM) ID) assigned to each company that supplies terminal management software. The authentication device 206 may receive information on the cust ID and the MDM ID from the manager device 202. In response to reception of the information on the cust ID and the MDM ID, the authentication device 206 may determine whether the manager device 202 is authenticated. When the identification information received from the manager device 202 matches pre-stored information, the authentication device 206 may call up a registration Application Program Interface (API) from the E-FOTA device 205. The authentication device 206 may receive information corresponding to the registration API from the E-FOTA device 205. The authentication device 206 may transmit the received information to the manager device 202. The transmitted information may be displayed through the manager device 202, and accordingly, the registration of the manager device 202 in the server may be indicated.

According to various embodiments, the identification information may further include a group ID assigned to the user device 203. When the user device 203 includes a plurality of electronic devices, the group ID may be an ID indicating the plurality of electronic devices. According to some embodiments, when some of the plurality of electronic devices and others of the plurality of electronic devices are grouped, the group ID may correspond to the number of groups. For example, when the plurality of electronic devices is divided into a first group and a second group, the number of group IDs may be two.

According to various embodiments, the manager device 202 may include an MDM console. The manager device 202 may receive input for identification information by a manager through the MDM console. The MDM console may be displayed within a User Interface (UI) of the manager device 202. The manager device 202 may determine identification information by identifying the detected input. Through the input of the identification information into the MDM console, the MDM console may be activated. The manager device 202 may call up the registration API for registering identification information from the authentication server 206 through the activated MDM console. The authentication server 206 may transmit the call made to the registration API to the E-FOTA device 205. The E-FOTA device 205 may generate information corresponding to the registration API in response to reception of the call made to the registration API. For example, the E-FOTA device 205 may generate a result of the registration API indicating that the manager device 202 is registered. The E-FOTA device 205 may transmit the generated information to the authentication device 206. The authentication device 206 may transmit the received information to the manager device 202. The manager device 202 may display the received information and, accordingly, the manager may identify the registration in the server.

According to various embodiments, the FOTA device 204, the E-FOTA device 205, and/or the authentication device 206 may be functional elements of the server 201. The above-described operations performed by the FOTA device 204, the E-FOTA device 205, and/or the authentication device 206 may be operations performed by the server 201.

According to various embodiments, the server 201 may have registered the user device 203 as a device for receiving the FOTA service. The server 201 may receive identification information from the user device 203. The server 201 may change the user device 203 into a device for receiving the E-FOTA service in response to reception of the identification information.

According to various embodiments, the server 201 may include information on the user device 203. The information on the user device 203 may be at least one piece of information on the current version of software included in the user device 203, information on the specifications of the user device 203, and information on an update version compatible with the user device 203.

According to various embodiments, the electronic device may update (or renew) software related to the update by installing an update program (or update information or the update) in the electronic device (for example, the user device 203) corresponding to the update version. The information on the compatible update version may be update information causing a change at a level at which conflict with software or an application installed in the user device 203 is not made.

According to various embodiments, the manager device 202 may make a request for information on the user device 203 to the server 201 in order to determine the update of the user device 203. The server 201 may transmit the information on the user device 203 to the manager device 202 on the basis of reception of the request for the information on the user device 203 from the manager device 202. For example, the information on the user device 203 may be information on the update version compatible with the user device 203. When the number of compatible update versions is plural, the server 201 may transmit information on a list of compatible update versions to the manager device 202. In some embodiments, the operation of making a request for information on the user device 203 and the operation of transmitting identification information may be performed at the same time. In this case, the server 201 may transmit information on the user device 203 to the manager device on the basis of authentication of the manager device 202.

According to various embodiments, the manager device 202 may determine an update version for the update of the user device 203 on the basis of the received information on the user device 203. For example, the manager device 202 may display the received information on the user device 203 and determine an update version corresponding to the detected input on the basis of the detection of the input for the displayed information. The determined update version may be referred to as a target version hereinafter.

According to various embodiments, the manager device 202 may transmit information on the target version to the user device 203. In some embodiments, the manager device 202 may transmit information on the target version to be updated to the user device 203 through terminal management software. In other embodiments, the manager device 202 may designate a time at which the update is to be performed and transmit information on the time together with the information on the target version to the user device 203. The user device 203 may make a request for the target version to the server 201 on the basis of the received information. For example, when receiving the information on the target version from the manager device 202, the user device 201 may display the received information. In response to detection of user input of the user device 203 for the displayed information, the user device 203 may make a request for the target version to the server 201. The server 201 may transmit update information corresponding to the target version to the user device 203 in response to the request. The user device 203 may perform the update on the basis of the received update information.

According to various embodiments, the manager device 202 may transmit the information on the target version to the server 201. In this case, the information on the determined update version may not be transmitted to the user device 203. In some embodiments, the manager device 202 may transmit information indicating a forcible update together with the information on the determined update version to the server 201. The server 201 may transmit the update information corresponding to the target version to the user device 203. The user device 203 may perform the update on the basis of the received update information. In this case, the user device 203 may be automatically (for example, forcibly) updated according to the reception of the update information from the server 201.

According to various embodiments, the user device 203 may receive the E-FOTA service by installing (or storing) terminal management software (for example, MDM) for managing the terminal. The user device 203 may receive identification information for the E-FOTA service from the manager service 202 through the terminal management software (for example, MDM). The user device 203 may transmit the received identification information to the server 201.

According to various embodiments, the user device 203 may be updated to the update version (for example, the target version) designated by the manager device 202. The user device 203 may be limited so as to be prevented from being updated to a version higher than the update version designated by the manager device 202. Accordingly, the user device 203 may be selectively updated to a required version.

Figure 3A:
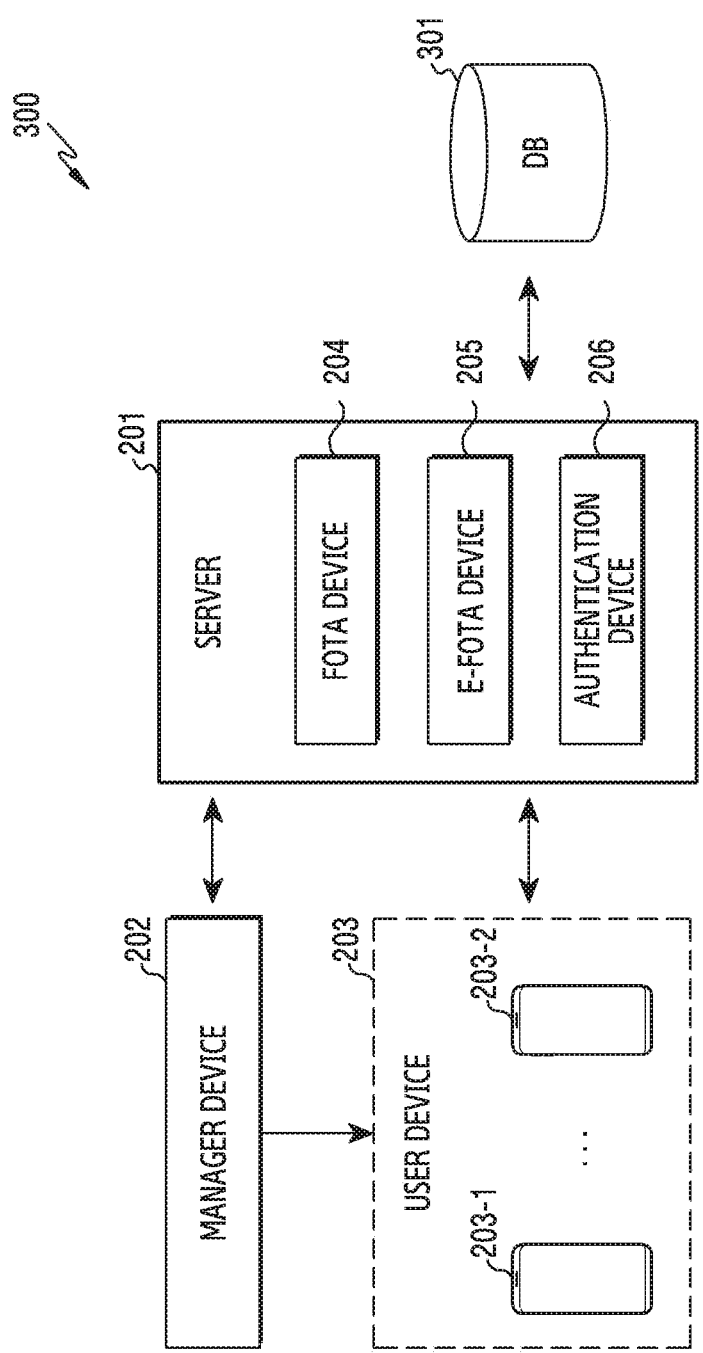
FIG. 3A illustrates an example of the functional configuration of electronic devices within the network environment according to various embodiments.

FIG. 3A illustrates an example of the functional configuration of electronic devices within a network environment according to various embodiments.

Referring to FIG. 3A, a plurality of devices may be included within a network environment 300. The plurality of devices may mutually transmit/receive information through a wireless or wired connection therebetween. The network environment 300 may correspond to the network environment 200 of FIG. 2, and thus a duplicated description will be omitted.

The server 201 according to various embodiments of the present disclosure may include the FOTA device 204, the E-FOTA device 205, and/or the authentication device 206 which can be functionally divided. The server 201 may be connected to a database 301. The database 301 may include information on an update. The information on the update may include, for example, at least one of records of update versions of software, programming information of update versions, the content of update versions, information on a device that can be updated, and identification information to be registered in the server. The server 201 may perform an operation related to the update through the connection to the database 301. For example, the server 201 may determine an update version that can be applied to the user device 203 by identifying update versions included in the database 301 and generate a list of the determined update versions. Although not illustrated, the database 301 may be included in the server, and may perform a function of storing information related to the update.

According to various embodiments, the server 201 may receive information on the update version and a designated group ID from the manager device 202. The server 201 may determine to forcibly update an electronic device corresponding to the designated group ID. The version to which forcible update is to be made may be determined on the basis of the received information on the update version. That is, when the designated group ID corresponds to the user device 203, the server 201 may forcibly update the user device 203 to the update version indicated by the received information.

The manager device 202 according to various embodiments of the present disclosure may perform an operation for authenticating identification information on the basis of detection of the identification information. For example, the manager device 202 may determine whether the identification information is authenticated through the authentication device 206 by transmitting the detected identification information to the server 201. The manager device 202 may transmit the authenticated identification information to the user device 203. According to various embodiments, the identification information may include an Identification (ID) (or a cust ID) for identifying the manager device 202, an ID (or a Mobile Device Management (MDM) ID) for identifying software (for example, terminal management software or an MDM application), and/or a group ID.

According to various embodiments, information on the group ID may be information required when the user device 203 is forcibly updated. When the user device 203 includes a plurality of electronic devices 203-1 and 203-2, the group ID may be an ID designated to each group to group the plurality of electronic devices 203-1 and 203-2. The server 201 may identify a group included in the user device 203 in response to reception of the group ID.

According to various embodiments, the manager device 202 may make a request for update information that can be used by the user device 203 to the server 201 after the authentication or together with the authentication process. In response to reception of the update information from the server 201, the manager device 202 may display the received update information. The update information may include information on at least one update version that can be used by the user device 203. The manager device 202 may detect input for the displayed update information. The manager device 202 may determine a target version corresponding to the detected input.

According to various embodiments, when the user device 203 includes a plurality of electronic devices, the manager device 202 may group the plurality of electronic devices. The manager device 202 may assign a group ID to each group in order to identify the group. The manager device 202 may determine an update version of each group. The update version determined for each group may be different. The manager device 202 may transmit the group ID together with information on the determined update version to the server 201.

According to various embodiments, when the user device 203 includes a first user device 203-1 and a second user device 203-2, the manager device 202 may make a request for information on the first user device 203-1 and the second user device 203-2 to the server 201. The server 201 may transmit the requested information on the first user device 203-1 and the second user device 203-2 to the manager device 202. The manager device 202 may display at least one update version which can be used by the first user device 203-1 and at least one update version which can be used by the second user device 203-2 on the basis of the received information. The manager may determine a first target version for updating the first user device 203-1 and a second target version for updating the second user device 203-2. The manager device 202 may transmit information on the first target version to the first user device and information on the second target version to the second user device.

According to various embodiments, the user device 203 may include a plurality of electronic devices. In this case, some of the plurality of electronic devices may be grouped and correspond to the first user device 203-1, and others of the plurality of electronic devices may be grouped and correspond to the second user device 203-2. The first user device 203-1 may be referred to as a first group and the second user device 203-2 may be referred to as a second group. Through the grouping, the manager device 202 may enable the provision of various update versions to respective groups. Through the provision of various update versions, respective groups may provide different functions for the same application. For example, for an application related to a group, different functions may be provided according to the position of a member.

Figure 3B:
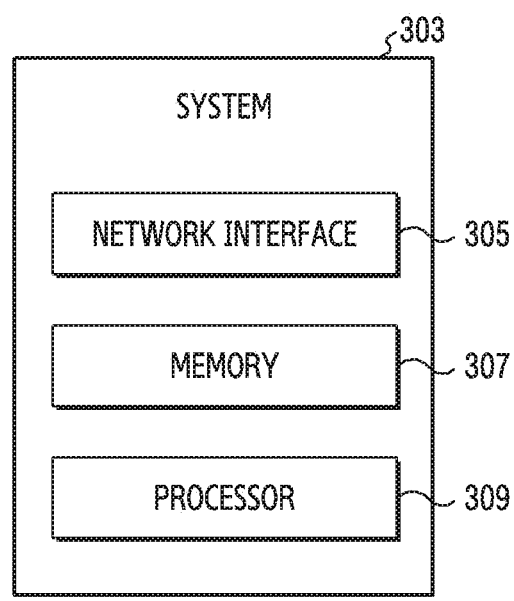
FIG. 3B is a block diagram illustrating a system within the network environment according to various embodiments.

FIG. 3B is a block diagram illustrating a system within the network environment according to various embodiments. According to various embodiments, the system 303 of FIG. 3B may correspond to the server 201 of FIG. 2 or 3.

Referring to FIG. 3B, the system 303 may include a network interface 305 (for example, the communication module 190), a memory 307 (for example, the memory 130), and a processor 309 (for example, the processor 120).

The network interface 305, the memory 307, or the processor 120 may perform an operation of the system 303 through a connection therebetween for the operation. The memory 307 may correspond to the database 301 of FIG. 3A, including various pieces of information related to the update. For example, the memory 307 may store information on versions of software updates related to the terminals (for example, the plurality of user devices 203-1 and 203-2) or a group to which at least some of the terminals belong. The stored versions may include a plurality of versions that can be used by the terminal.

According to various embodiments, through the network interface 305, the system 303 may be used for the connection to the user device 203 or the manager device 202. Through the network interface 305, the system 303 may transmit/receive information to/from the user device 203 or the manager device 202.

According to various embodiments, the manager device 202 may be referred to as an external server, and may be connected to the system 303 through the network interface 305 wirelessly or through a wire. The system 303 may receive at least one Identification (ID) (or information indicating an ID) from the manager device 202. The system 303 may store at least one received ID in the memory 307. The system 303 may receive a request related to at least one ID (or information including at least one ID) from the user device 203. The received request may be a request for registering the user device 203 in the system 303. For example, the registration may correspond to mapping between information on the user device 203 and at least one ID stored in the memory 307 of the system 303 and storage of the mapped information and ID. In another example, the registration may correspond to storing information indicating that the user device 203 can be controlled by the manager device 202 in the memory 307 of the system 303. The system 303 may register the user device 203 in response to reception of a request.

According to various embodiments, at least one ID may include a first ID related to the manager device 202 and a second ID related to a group of the user device 203. The first ID may be an ID pre-designated by the system 303, and the manager device 202 may perform authentication by transmitting information on the first ID to the system 303.

According to various embodiments, when the user device 203 includes a plurality of electronic devices, the second ID may be an ID indicating a group of the plurality of electronic devices. Depending on the number of groups, the second ID may include the number of IDs corresponding to the number of groups. For example, when the user device 203 includes a first group and a second group, the second ID may include an ID for the first group and an ID for the second group.

According to various embodiments, the system 303 may receive a request for a list of software updates from the manager device 202. The system 303 may generate the list of software updates in response to reception of the request. Information on the software updates may be included (or stored) in the memory 307.

According to various embodiments, the memory 307 may include various pieces of information related to the update. For example, the memory 307 may include information on update versions that can be used by the user device 203. The available update versions may be a plurality of update versions. In another example, the memory 307 may include information indicating the latest update version of software included in the user device 203. In another example, when the user device 203 includes a plurality of groups (or sub-groups), the memory 307 may include information on update versions that can be used by electronic devices included in each group in common.

According to various embodiments, the system 303 may generate the list of software updates on the basis of information included in the memory 307. The list of software updates may be a list indicating a plurality of available versions. The system 303 may provide information indicating the generated list to the manager device 202.

According to various embodiments, the system 303 may receive information on the user device 203 or information on a selected version of the software update from the manager device 202. When the user device 203 includes a plurality of electronic devices, the information on the user device 203 may be information on groups including the electronic devices or at least some of the plurality of electronic devices. The information on the selected version of the software update may be a version selected to update the user device 203. For example, the information on the selected version of the software update may be information including a forcible update request for updating the user device 203 to a designated update version. The system 303 may update the user device 203 on the basis of reception of the information on the user device 203 or the information on the selected version of the software update.

According to various embodiments, the system 303 (for example, the server 201) may include at least one network interface (for example, the network interface 305), at least one processor (for example, the processor 309) operatively connected to the at least one network interface, and at least one memory (for example, the memory 307) configured to store a plurality of versions of software updates for a group of mobile devices and operatively connected to the at least one processor, and the at least one memory may store instructions causing the at least one processor, when executed, to receive a request for providing a list of software updates from an external server through the at least one network interface, to generate the list of the software updates, the list including information on a plurality of versions of the software updates, to provide the list to the external server through the at least one network interface, to receive a request for providing a selected version of the software update from one of the mobile devices through the at least one network interface, and to provide the selected version of the software update to the one of the mobile devices through the at least one network interface, the selected version not being the latest version.

According to various embodiments, the server 201 may include a communication module; a memory configured to store instructions; and at least one processor, and the at least one processor may be connected to the communication module and the memory and may be configured to execute instructions stored to transmit information on an update list to the manager device 2023 in response to reception of a request of the update list from the manager device 202, the update list including information on at least one update version related to the user device 203, and to transmit information for updating software of the user device 203 to the received update version in response to reception of a request for one update version included in the update list from the user device 203.

Figure 4A:
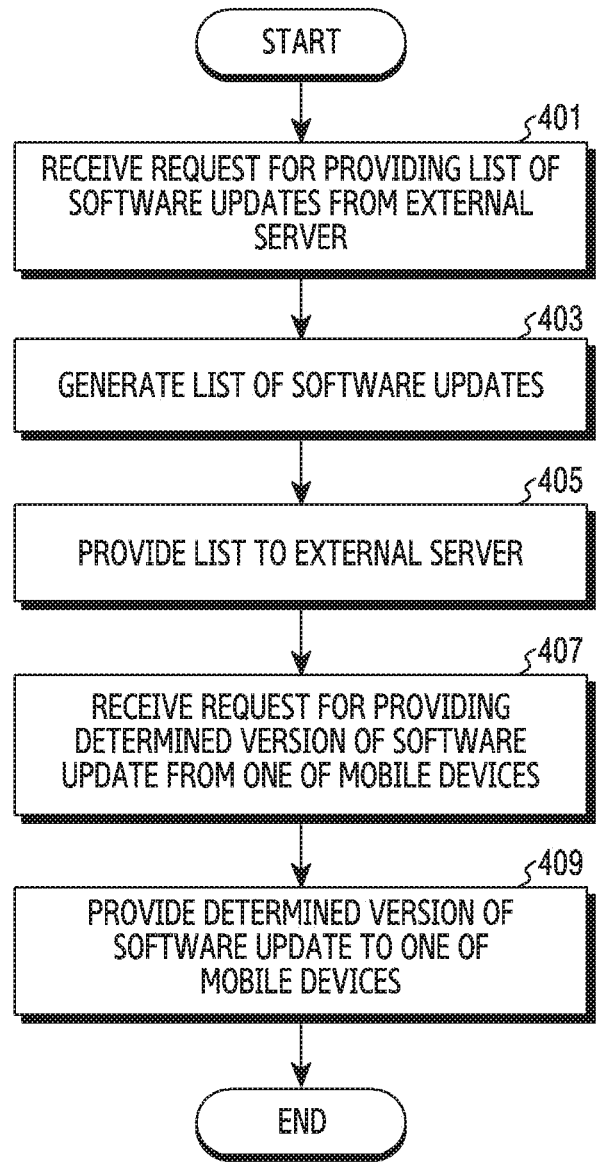
FIG. 4A illustrates an example of the operation of a system for providing an update according to various embodiments.

FIG. 4A illustrates an example of operation of the system for providing an update according to various embodiments.

In operation 401, the system 303 (for example, the server 201) may receive a request for providing a list of software updates from an external server (for example, the manager device 202). The external server may be a server authenticated by the system 303. The external server may transmit/receive information to/from the system 303 on the basis of the authentication. The external server may make a request for information related to the system 303 and updates of mobile devices (for example, the user device 203) on the basis of authentication. The information related to the updates may include, for example, a list of software updates. The list of software updates may include information on update versions of software that can be installed in (or used by) mobile devices. The update versions may be number indications of development steps and orders of software. As the number indicating the update version is larger, the update version may be a more recent version. Software related to the update may be updated (or renewed) by installing an update program (or update information or update) corresponding to the update version in the mobile device.

In operation 403, the system 303 may generate the list of software updates. The system 303 may generate the list of software updates indicating at least one update version in response to reception of a request for the list from an external server.

In operation 405, the system 303 may provide the list to the external server. The system 303 may transmit information on the list of software updates to the external server in operation 403. The external server may identify at least one update version included in the list in response to reception of the information.

According to various embodiments, the external server may determine at least one update version among at least one identified update version. In some embodiments, the external server may transmit information on the determined update version to mobile devices. In other embodiments, when the mobile devices are grouped into at least two groups, the external server may determine an update version corresponding to each group. The external server may transmit information on the determined update version corresponding to mobile devices included in each group.

In operation 407, the system 303 may receive a request for providing the determined (or selected) version of the software update from one of the mobile devices (for example, the user device 203). At least some of the mobile devices may transmit a request for the determined version to the system 303 on the basis of the information on the update version received from the external server. The system 303 may determine an update version corresponding to the request on the basis of the transmitted request. Update information (or an update program) corresponding to the update version may be stored in the memory 307 of the system 303.

In operation 409, the system 303 may provide the determined version of the software update to one of the mobile devices. In order to update one of the mobile devices, the system 303 may transmit update information on the determined version of the software update. One of the mobile devices may be updated on the basis of the received information.

Figure 4B:
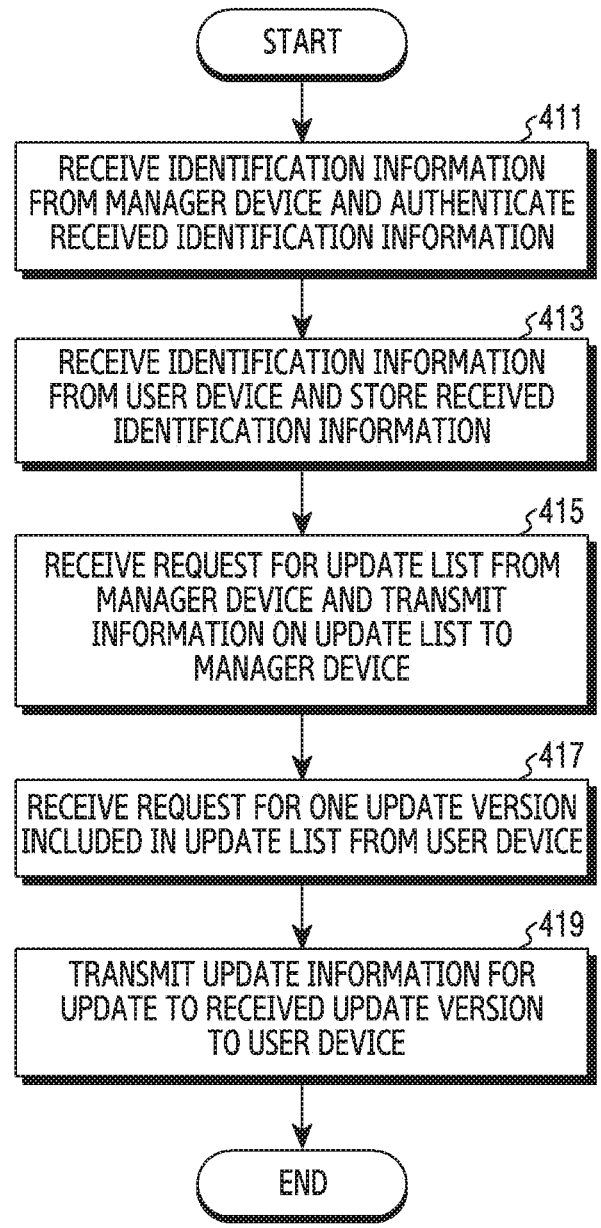
FIG. 4B illustrates another example of the operation of a server for providing an update according to various embodiments.

FIG. 4B illustrates another example of the operation of the electronic device for providing the update according to various embodiments.

In operation 411, the server 201 may receive identification information from the manager device 202 and authenticate the received identification information. The server 201 may include pre-stored identification information. The server 201 may determine whether the received identification information corresponds to the pre-stored identification information on the basis of reception of the identification information from the manager device 202.

According to various embodiments, when the received identification information corresponds to the pre-stored identification information, the server 201 may store the received identification information. The server 201 may transmit information indicating that the manager device 202 is completely authenticated to the manager device 202 on the basis of storage of the received identification information. The manager device 202 may provide the information indicating completion of the authentication to the manager by displaying the transmitted information. The manager may be a user using the manager device 202.

According to various embodiments, the server 201 may include the authentication device 206 and the E-FOTA device 205. The server 201 may determine whether the manager device 202 is authenticated through the authentication device 206, and when the authentication is completed, make a request for an API to the E-FOTA device 205. The API may be information generated through the E-FOTA device 205. In some embodiments, the E-FOTA device 205 may select an API for displaying notification of completion of the authentication on the basis of the request of the authentication device 206. The selected API may be provided to the authentication device 206 from the E-FOTA device 205. The authentication device 206 may transmit information indicating completion of the authentication to the manager device 202 on the basis of the provided API. In other embodiments, the E-FOTA device 205 may store (or register) information on the manager device 202 on the basis of the request of the authentication device 206. The E-FOTA device 205 may select an API indicating that storing is completed. The selected API within the E-FOTA may be provided to the authentication device 206 from the E-FOTA device 205. The authentication device 206 may transmit information indicating that storing (or registration) is completed to the manager device 202 on the basis of the provided API.

In operation 413, the server 201 may receive identification information from the user device 203 and store the received identification information. The server 201 may receive identification information related to authentication of the manager device 202 from the user device 203. The server 201 may identify that the user device 203 is an electronic device controlled by the manager device 202 on the basis of reception of the identification information. The server 201 may store the received identification information.

According to various embodiments, the server 201 may receive information on the user device 203. For example, the server 201 may receive capability, specifications, functions, or information on software installed in the user device 203. The server 201 may determine an update version which can be installed in the user device 203 on the basis of the received information. In some embodiments, the user device 203 may transmit information on the user device 203 together with identification information to the server 201. In other embodiments, regardless of transmission of the identification information, the user device 203 may periodically transmit the information on the user device 203 to the server 201.

According to various embodiments, the server 201 may include the FOTA device 204 and the E-FOTA device 205. The FOTA device 204 may pre-store the information on the user device 203 on the basis of a connection made in advance with the user device 203 before operation 411. The FOTA device 204 may map and store the information on the user device 203 and the identification information on the basis of reception of the identification information. The FOTA device 204 may be synchronized with the E-FOTA device 206, and the E-FOTA device 206 may identify the information on the user device 203 and relevant information on the basis of the synchronization. According to an embodiment, the relevant information may be referred to as registration information, but is not limited thereto.

In operation 415, the server 201 may receive a request for an update list from the manager device 202 and transmit information on the update list to the manager device 202. The server 201 may receive the request for the update list from the manager device 202. The server 201 may generate the update list in response to reception of the request for the update list. The update list may include information indicating update versions that can be used by the user device 203. The server 201 may transmit information on the update list to the manager device 202.

According to various embodiments, the manager device 202 may display an update list (for example, a list 901 of FIG. 9) within the user interface on the basis of the received information on the update list. The manager device 202 may detect input related to the displayed update list. For example, the manager device 202 may detect input for selecting one update version included in the update list. The input may be performed in various types (for example, click, double-click, tap, double-tap, or voice input) to determine an update version, but is not limited thereto. The update list displayed within the user interface may refer to FIG. 9.

According to various embodiments, the manager device 202 may select one update version included in the update list. The manager device 202 may transmit information on the selected update version to the user device 203. In some embodiments, when the user device 203 includes a plurality of groups, the manager device 202 may determine an update version corresponding to each of the plurality of groups. The manager device 202 may transmit the determined update version to the user device 203.

In operation 417, the server 201 may receive a request for one update version included in the update list from the user device 203. The update version corresponding to the request may be an update version determined by the manager device 202. The user device 203 may transmit a request for the update version to the server 201 on the basis of reception of information on the determined update version from the manager device 202.

In operation 419, the server 201 may transmit update information for the update to the received update version to the user device 203. The server 201 may transmit update information (or an update program) of the update version corresponding to the request to the user device 203 in response to reception of the request for the update version. The user device 203 may be updated to the update version on the basis of reception of the update information.

According to various embodiments, when the user device 203 includes a plurality of electronic devices divided into a plurality of groups, respective groups may receive update information on different update versions. The respective groups may be updated to different update versions. For example, the user device 203 may include a first group including a first electronic device and a second electronic device and a second group including a third electronic device and a fourth electronic device. An update version determined for the first group may be a first version and an update version determined for the second group may be a second version. In this case, the first electronic device and the second electronic device may be updated to the first version and the third electronic device and the fourth electronic device may be updated to the second version.

Figure 5:
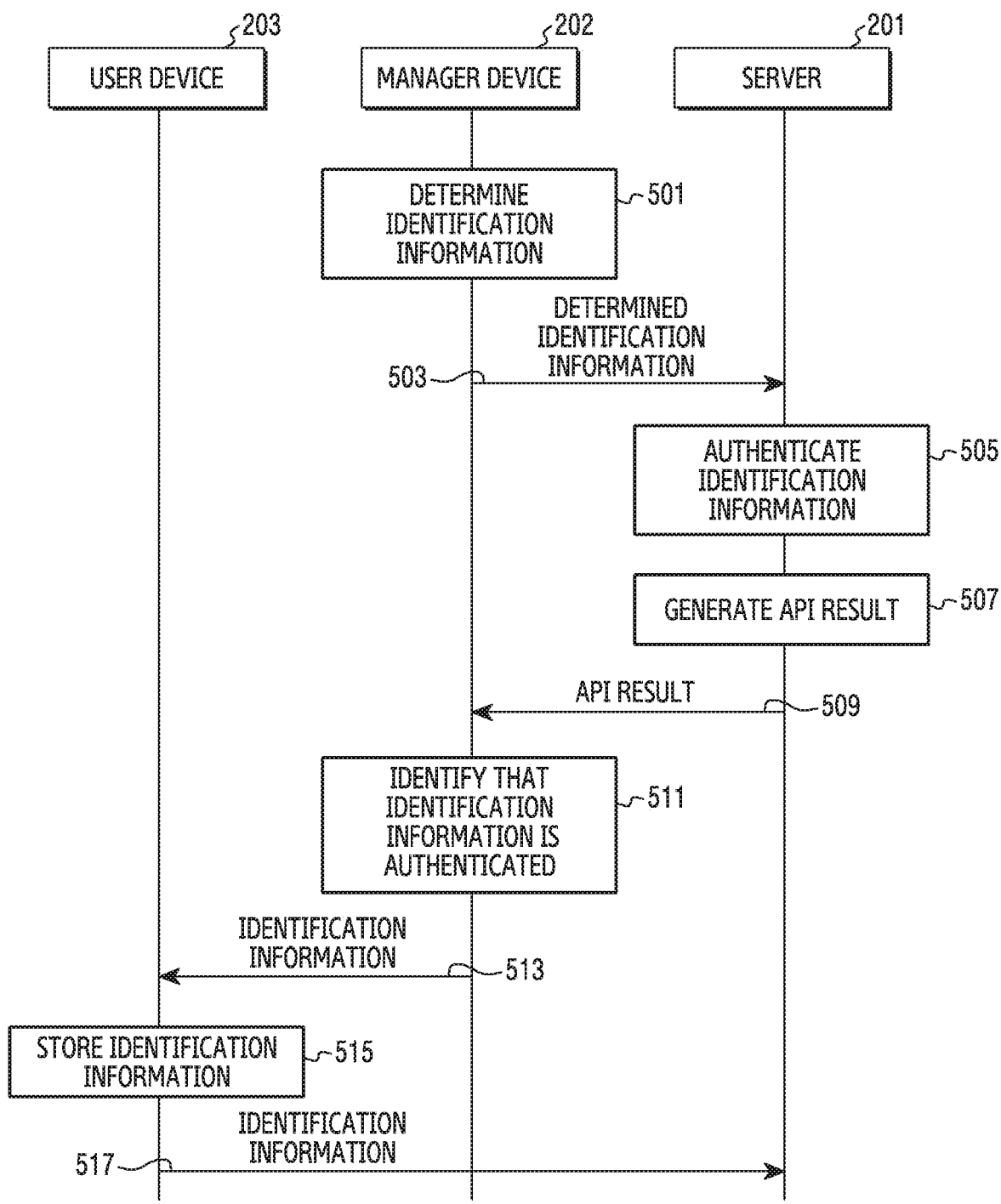
FIG. 5 illustrates an example of a signal flow for registering a user device including identification information in a server according to various embodiments.

FIG. 5 illustrates an example of a signal flow for registering a user device including identification information in a server according to various embodiments. Referring to FIG. 5, the server 201, the manager device 202, or the user device 203 may transmit/receive signals for identifying the manager device 202 or the user device 203.

In operation 501, the manager device 202 may determine identification information. The manager device 202 may determine identification information in response to detection of identification information input by the manager. The identification information may be identification information pre-designated in connection with the server 201. The identification information may be an ID for authenticating the manager device 202 with respect to the server 201. According to an embodiment, the identification information may further include a group ID for grouping the user device 203.

In operation 502, the manager device 202 may transmit the determined identification information to the server 201. In order to receive information on whether the determined identification information corresponds to the pre-designated identification information from the server 201, the manager device 202 may transmit the determined identification information.

In operation 503, the server 201 may authenticate the identification information. The server 201 may determine whether the received identification information is authenticated. For example, the server 201 may determine whether the received identification information corresponds to the pre-designated identification information. When the received identification information corresponds to the pre-designated identification information, the server 201 may determine that the identification information is completely authenticated.

According to various embodiments, when the identification information includes a group ID, the server 201 may store the identification information. The server 201 may identify information on the user device 203 related to the manager device 202 on the basis of the stored information.

In operation 507, the server 201 may generate an API result. The server 201 may generate the API result on the basis of authentication of the identification information. The API result may be, for example, information indicating that the identification information is authenticated. In another example, the API result may be setting information of a user interface for displaying whether the identification information is authenticated.

In operation 509, the server 201 may transmit the API result to the manager device 202. The server 201 may transmit the API result in order to provide information on whether the identification information is authenticated to the manager device 203.

In operation 511, the manager device 202 may identify that the identification information is authenticated. The manager device 202 may identify that the determined identification information is authenticated by the server 201 in response to reception of the API result. Although not illustrated, the manager device 202 may display a notification indicating completion of the authentication to the manager device 202 on the basis of the API result according to various embodiments.

In operation 513, the manager device 202 may transmit the identification information to the user device 203. In some embodiments, the manager device 202 may transmit the identification information to the user device 203 in order to control the user device 203. In other embodiments, the manager device 202 may transmit the identification information to the user device 203 in order to map the manager device 202 and the user device 203.

In operation 515, the user device 203 may store the received identification information. According to various embodiments, the user device 203 may register the received identification information through terminal management software.

In operation 517, the user device 203 may transmit the identification information to the server 201. The user device 203 may register (or store) the identification information in the server 201 by transmitting the identification information to the server 201. Although not illustrated, the server 201 may register the user device 203 as a device to receive an E-FOTA service in response to reception of the identification information from the user device 203. The E-FOTA service may be an update service provided to an enterprise.

Figure 6:
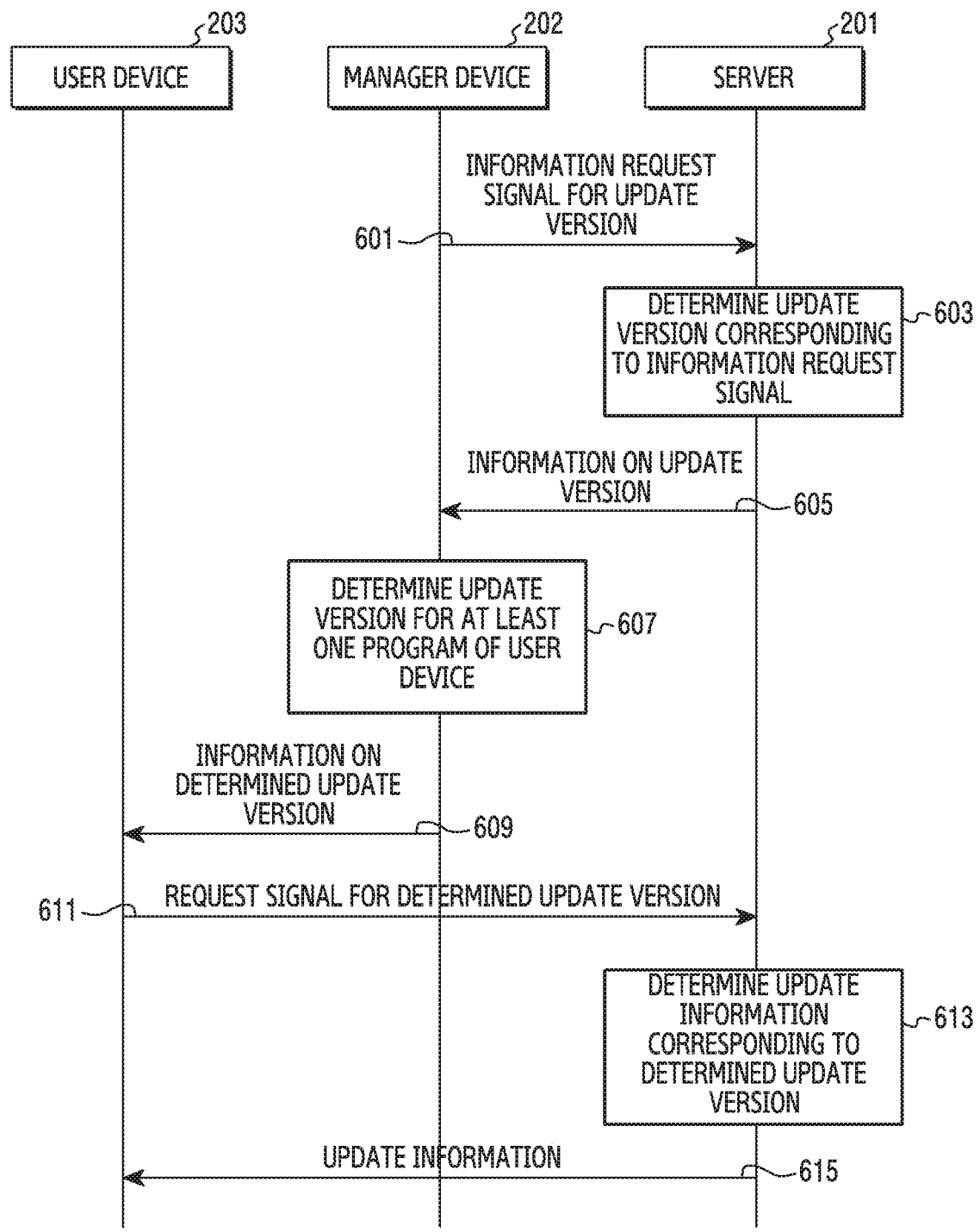
FIG. 6 illustrates an example of a signal flow for updating software of a user device on the basis of a request for a determined update version according to various embodiments.

FIG. 6 illustrates an example of a signal flow for updating software of a user device on the basis of a request for a determined update version according to various embodiments. Referring to FIG. 6, the server 201, the manager device 202, or the user device 203 may transmit/receive signals for updating the user device 203.

In operation 601, the manager device 202 may transmit an information request signal for an update version to the server 201. The manager device 202 may transmit a signal for making a request for an update list including information on the update version to the server 201. The information on the update version may be an update version which can be used by the user device 203.

According to various embodiments, operation 601 may be an operation performed after the identification information of the manager device 202 is registered (or stored) through the server 201.

In operation 603, the server 201 may determine an update version corresponding to the information request signal. The server 201 may determine the update version that can be used by the user device 203 on the basis of the registered information related to the user device 203.

In operation 605, the server 201 may transmit information on the update version to the manager device 202. The server 201 may transmit the information on the update version to the manager device 202 in response to the information request signal of the manager device 202.

In operation 607, the manager device 202 may determine an update version for at least one program of the user device 203. The at least one program may be a program stored in the user device 203. For example, the program stored in the user device 203 may be an application, software, or firmware stored in the user device 203.

In operation 609, the manager device 202 may transmit information on the determined update version to the user device 203. The manager device 202 may transmit the information on the update version to the user device 203 in order to update the user device 203.

In operation 611, the user device 203 may transmit a request signal for the determined update version to the server 201. The user device 203 may transmit a signal for making a request for the update version to the server 201 in response to reception of the information on the update version in operation 609.

In operation 613, the server 201 may determine update information corresponding to the determined update version on the basis of the received information. The server 201 may determine update information on the basis of information stored in the database.

In operation 615, the server 201 may transmit the update information to the user device 203. The server 201 may transmit update information corresponding to the determined update version to the user device 203.

Although not illustrated, when the user device 203 receives the update information, the user device 203 may display a window for determining whether to perform update according to various embodiments. The window may be user input of the user device 203 that accepts the update. The user device 203 may perform the update in response to detection of the user input.

Figure 7:
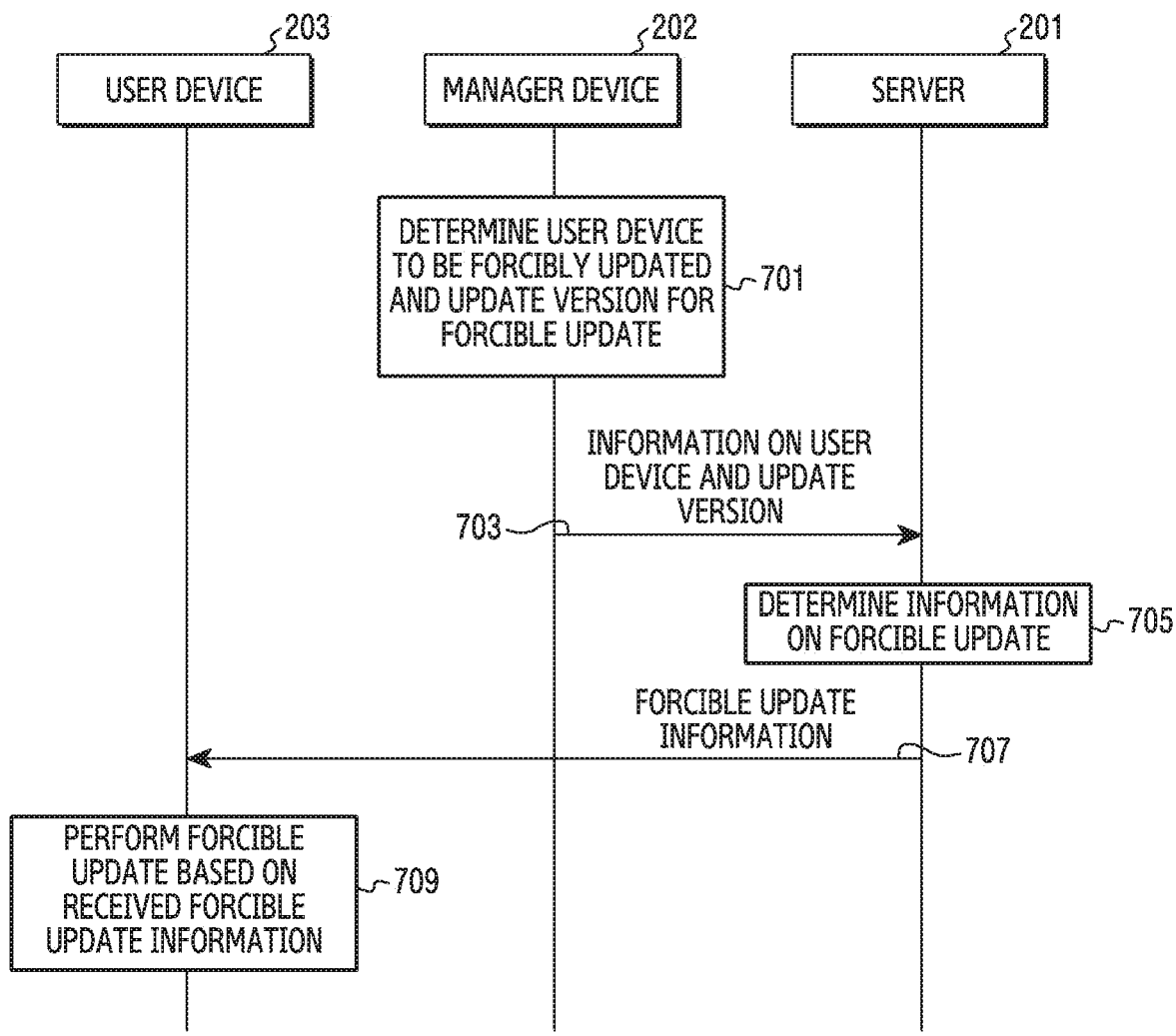
FIG. 7 illustrates another example of the signal flow for forcibly performing an update according to various embodiments.

FIG. 7 illustrates another example of the signal flow for performing a forcible update according to various embodiments. Referring to FIG. 7, the server 201, the manager device 202, or the user device 203 may transmit/receive signals for forcible update of the user device 203.

In operation 701, the manager device 202 may determine the user device to be forcibly updated and the update version for the forcible update. The user device to be forcibly updated may correspond to the user device 203. The forcible update may be an update of the user device 203 performed without any request for the update from the user device 203.

In operation 703, the manager device 202 may transmit information on the user device 203 and the determined version to the server 201. The manager device 202 may transmit information on the user device 203 to be forcibly updated and information on the update version to the server 201. According to various embodiments, operation 703 may correspond to operation 607 of FIG. 6.

According to various embodiments, the information on the user device to be forcibly updated may be information indicating the user device 203. In some embodiments, the user device 203 may be a set of a plurality of electronic devices. Each of the plurality of electronic devices may store the same group ID. The manager device 202 may transmit information on the group ID to the server 201 in order to forcibly update all of the plurality of electronic devices related to the group ID. In other embodiments, the user device 203 may include different groups for different electronic devices. For example, the user device 203 may include a first group including a first electronic device and a second electronic device and a second group including a third electronic device and a fourth electronic device. The first group may include a first group ID and the second group may include a second group ID. When the manager device 202 determines the first group as the user device 203 to be forcibly updated in operation 701, the information on the user device may be the first group ID indicating the first group.

According to various embodiments, the information on the update version may be information indicating one of a plurality of update versions included in an update list displayed on the manager device 202.

In operation 705, the server 201 may determine an update version for forcibly updating the user device 203 on the basis of received information. The server 201 may determine update information on the update version received through operation 703 among the stored update information. The update information may be a program for updating the user device 203.

In operation 707, the server 201 may transmit information on the forcible update to the user device 203. The server 201 may transmit update information corresponding to the determined update version in operation 705.

In operation 709, the user device 203 may perform the forcible update on the basis of the received forcible update information. When receiving the forcible update information, the user device 203 may be forcibly updated without any process of receiving user input of the user device 203.

Although not illustrated, when the update is completed, the user device 203 may transmit a signal indicating the completion of the update to the server 201. The transmitted signal may include information on the completed update version. The server 201 may determine whether the update is completed by identifying the received signal. In some embodiments, the forcible update of the user device 203 may not be performed. For example, when power is turned off, the forcible update may not be performed. In another example, when a connection to the server is unstable or is disconnected, the forcible update may not be performed. When the forcible update is not performed, the signal indicating the completion of the update from the user device 203 may not be transmitted to the server 201. According to an embodiment, the signal indicating the completion of the update may be transmitted from the user device 203 to the server 201 on the basis of an application difference from a terminal management application (for example, an MDM application).

Figure 8:
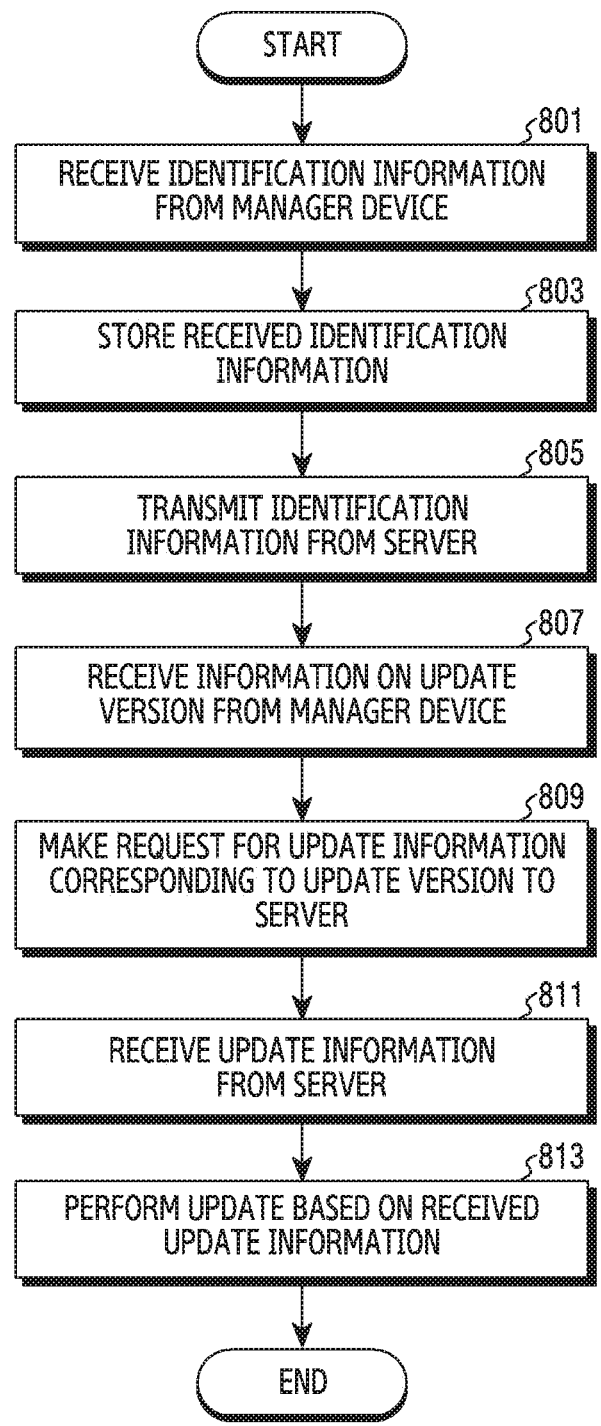
FIG. 8 illustrates an example of the operation of a user device for performing an update according to various embodiments.

FIG. 8 illustrates an example of the operation of a user device for performing an update according to various embodiments. FIG. 8 illustrates operations of the user device 203 to be updated by receiving update information for the update from the server 201 (or the system 303) according to various embodiments.

In operation 801, the user device 203 may receive identification information from the manager device 202. The received identification information may be information determined by the manager device 202. The received identification information may include information on an ID of terminal management software and an ID of the manager device 202. According to an embodiment, the received identification information may include a group ID assigned to the user device 203. In connection with the group ID, the user device 203 may belong to the same group to which another electronic device including the same group ID belongs. The group may be determined by the manager device 202, and the manager device 202 may manage (or control) updates of the user device 203 and another electronic device for each group.

In operation 803, the user device 203 may store the received information. The user device 203 may store the received identification information in response to reception of the identification information. The operation of storing the received identification information may be an operation of registering the user device 203 in a group designated by the manager device 202 through terminal management software.

In operation 805, the user device 203 may transmit the identification information to the server 201. The user device 203 may transmit the identification information to the server

201 on the basis of storage of the identification information. According to various embodiments, the server 201 may include information on the user device 203 to which a FOTA service is provided. The server 201 may store the information on the user device 203 as a device associated with the manager device 202 (or a device to receive the E-FOTA service) on the basis of reception of the identification information from the user device 203.

In operation 807, the user device 203 may receive information on an update version from the manager device 202. The user device 203 may receive information on an update version determined by the manager device 202. The determined update version may be a version to which it is determined that the user device 203 is to be updated. In some embodiments, the determined update version may not be the latest version. In other embodiments, the determined update version may be an update version that can be used by the user device 203.

In operation 809, the user device 203 may make a request for update information corresponding to the update version to the server 201. The user device 203 may transmit, to the server 201, information on the update version received from the manager device 202. The user device 203 may make a request for update information corresponding to the update version through the operation of transmitting the information on the update version to the server 201.

In operation 811, the user device 203 may receive the update information from the server 201. The received update information may be the update information requested in operation 809. The update information may be an update installation file for updating the user device 203.

In operation 813, the user device 203 may update at least one piece of software included in the user device 203 on the basis of the received update information. In some embodiments, the user device 203 may display a window (for example, a window 1001) for detecting input for updating the user device 203 within a user interface before updating the user device 203. In other embodiments, when the update information is the received update installation file, the user device 203 may perform the update by executing the file. In other embodiments, the user device 203 may perform the update in response to reception of the update information. The at least one piece of software may be, for example, an application or firmware stored in the user device 203.

Figure 9:
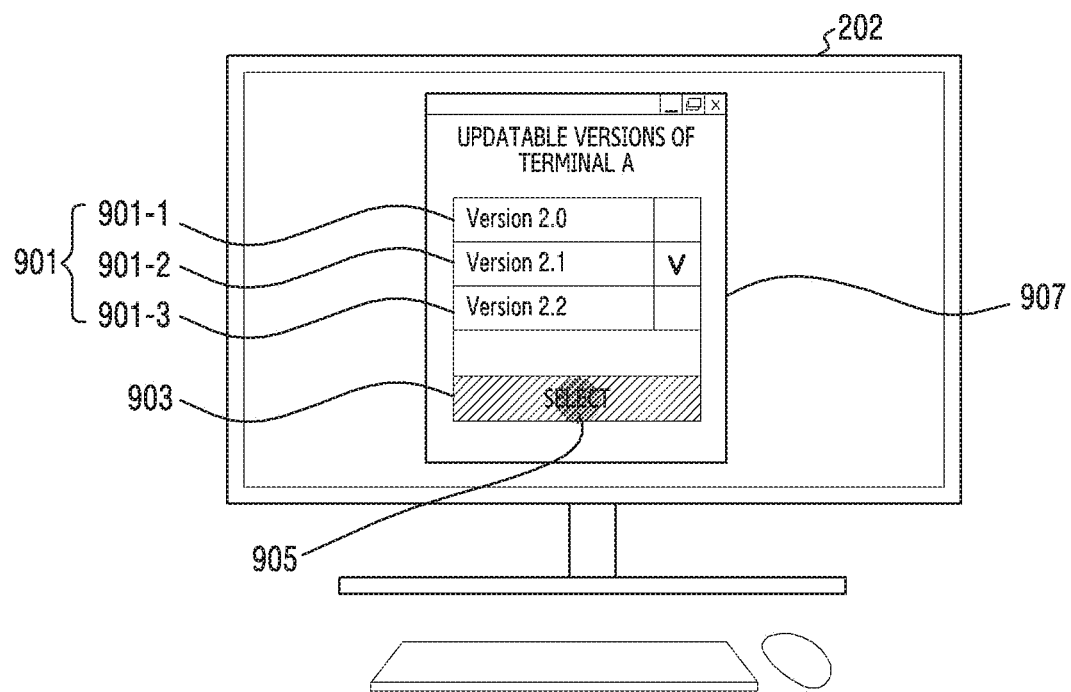
FIG. 9 illustrates an example of a user interface of a manager device for determining an update version according to various embodiments.

FIG. 9 illustrates an example of a user interface of a manager device for determining an update version according to various embodiments. According to various embodiments, the electronic device for determining the update version may correspond to the manager device 202.

Referring to FIG. 9, the manager device 202 may display a window 907 including an update list 901. Terminal A, displayed in the window 907, may be the user device 203, and updatable versions may be update versions that can be used by the user device 203. The window 907 indicates the case in which a version 901-2 is selected as an update version for updating the user device 203. The update list 901 may include content 901-1 indicating version 2.0, content 901-2 indicating version 2.1, and content 901-3 indicating version 2.2.

Although not illustrated, on the basis of detection of input for the content 901-2, version 2.1 may be selected, and an indication for selection of version 2.1 may be displayed on the right side of the content 901-2. The input for version 2.1 may be performed in various types. For example, version 2.1 may be selected through one input type selected from among click, double-click, tap, and double-tap for the content 901-2.

The window 907 may include a Graphical User Interface (GUI) 903 (for example, an icon or a button) for detecting input for finally determining the update version of the user device 203. The manager device 202 may determine version 2.1 as the update version on the basis of detection of an input 905 for the GUI 903. The user input 905 may be performed through various types (for example, click, double-click, tap, and double-tap). In some embodiments, the manager device 202 may transmit information on version 2.1 to the user device 203 on the basis of determination of the update version. In other embodiments, the update version determined through the window 907 may be a version for forcible update of the user device 203. In this case, the manager device 202 may transmit information on the determined update version to the server 201.

Figure 10:
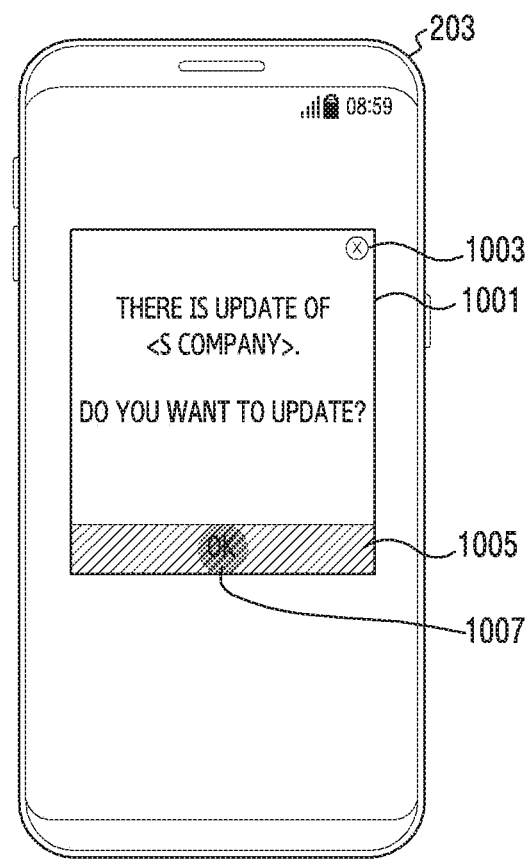
FIG. 10 illustrates an example of a user interface of a user device for performing an update according to various embodiments.

FIG. 10 illustrates an example of a user interface of a user device for performing an update according to various embodiments. According to various embodiments, an electronic device to be updated may correspond to the user device 203.

Referring to FIG. 10, the user device 203 may display a window 1001 in response to reception of update information corresponding to an update version from the server 201. The window 1001 may include a GUI 1005 (for example, an icon or a button) for detecting user input 1007 made using the user device 203. The user device 203 may perform an update in response to detection of the user input 1007 for the GUI 1005. The user input 1007 may be performed through various types (for example, click, double-click, tap, and double-tap). According to embodiments, the window 1001 may include a GUI 1003 (for example, an icon or a button) for ceasing the display of the window 1001. The user device 203 may not perform the update in response to detection of the user input for the GUI 1003.

According to various embodiments, the user device 203 may be forcibly updated. The forcible update may be an update performed regardless of whether user input 1007 for the user device 203 is detected or not. In this case, the window 1001 may not be displayed.

According to various embodiments, a method of an electronic device may include an operation of transmitting information on an update list to a first external device in response to reception of a request for the update list from the first external device, the update list including information on at least one update version related to a second external device, and an operation of transmitting information for updating software of the second external device to the received update version in response to reception of a request for one update version included in the update list from the second external device.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory #38) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Methods disclosed in the claims and/or methods according to various embodiments described in the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although specific embodiments have been described in the detailed description of the disclosure, modifications and changes may be made thereto without departing from the scope of the disclosure. Therefore, the scope of the disclosure should not be defined as being limited to the embodiments, but should be defined by the appended claims and equivalents thereof.

What is claimed is:

1. A system comprising:
   at least one network interface;
   at least one processor operatively connected to the at least one network interface;
   at least one memory configured to store at least one Identification (ID) received from an external server through the at least one network interface; and
   a plurality of versions of software updates for a group of mobile devices and operatively connected to the at least one processor,
   wherein the at least one memory stores instructions causing the at least one processor, when executed, to:
      register one of the mobile devices through the at least one ID based on a request from the one of the mobile devices,
      receive a request for providing a list of software updates from the external server through the at least one network interface,
      generate the list of the software updates, the list including information on a plurality of versions of the software updates,
      provide the list to the external server through the at least one network interface,
      receive a request for providing a selected version of the software updates from the one of the mobile devices through the at least one network interface, and
      provide the selected version of the software update to the one of the mobile devices through the at least one network interface, the selected version not being the latest version.

2. The system of claim 1, wherein the instructions cause the at least one processor, before receiving the request for providing the list, to:
   receive the at least one ID from the external server through the network interface,
   store the at least one ID in the memory,
   receive the request from the one of the mobile devices for registering through the network interface, the request including the at least one ID, and
   register the one of the mobile devices through the at least one ID.

3. The system of claim 1, wherein the at least one ID includes a first ID related to the external server and a second ID related to management of the group of the mobile devices.

4. The system of claim 3, wherein the at least one ID further includes at least one third ID indicating a sub-group of the group of the mobile devices.

5. An electronic device comprising:
   a communication module;
   a memory configured to store instructions; and
   at least one processor,
   wherein the at least one processor is connected to the communication module and the memory and is configured to:
      execute instructions stored to transmit information on an update list to a first external device in response to reception of a request of the update list from the first external device, the update list including information on at least one update version related to a second external device, and
      transmit information for updating software of the second external device to the received update version in response to reception of a request for one update version included in the update list from the second external device.

6. The electronic device of claim 5, wherein the at least one processor is further configured to:
   execute the instructions stored to receive first information for authentication from the first external device,
   determine whether the received first information matches information pre-stored in the electronic device, and
   authenticate the first external device based on the determination.

7. The electronic device of claim 6, wherein the at least one processor is further configured to execute the instructions stored to receive second information indicating the second external device from the first external device and to store the second external device mapped to the first external device based on the received second information.

8. The electronic device of claim 5, wherein the at least one processor is further configured to execute the instructions stored to determine the second external device as a device related to the first external device in response to reception of a signal including first information from the second external device and to update pre-stored information on the second external device based on the determination.

9. The electronic device of claim 5, wherein the at least one processor is further configured to execute the instructions stored to determine the at least one update version for updating at least one piece of software of the second external device and to generate the update list including the information on the at least one update version.

10. The electronic device of claim 9, wherein the at least one processor is further configured to execute the instructions stored to update the at least one determined update version in response to reception of a signal indicating completion of the update from the second external device and to update the generated update list based on the at least one updated update version.

11. The electronic device of claim 5, wherein the at least one processor is further configured to execute the instructions stored to transmit update information corresponding to the received information to the second external device in response to reception of information on a version for updating the second external device from the first external device, and the second external device is an electronic device updated based on the transmitted update information.

12. The electronic device of claim 11,
   wherein the information on the version for updating the second external device includes information on a time point at which the second external device is updated, and
   whererin the at least one processor is further configured to execute the instructions stored to transmit update information corresponding to the received information to the second external device at the time point.

13. A method of an electronic device, the method comprising:
   transmitting information on an update list to a first external device in response to reception of a request of the update list from the first external device, the update list including information on at least one update version related to a second external device; and
   transmitting information for updating software of the second external device to the received update version in response to reception of a request for one update version included in the update list from the second external device.

14. The method of claim 13, further comprising:
   receiving first information for authentication from the first external device;

determining whether the received first information matches information pre-stored in the electronic device; and authenticating the first external device based on the determination.

15. The method of claim 14, further comprising:

receiving second information indicating the second external device from the first external device; and storing the second external device mapped to the first external device based on the received second information.

16. The method of claim 13, further comprising:

determining the second external device as a device related to the first external device in response to reception of a signal including first information from the second external device; and changing pre-stored information on the second external device based on the determination.

17. The method of claim 13, further comprising:

determining the at least one update version for updating at least one piece of software of the second external device; and generating the update list including the information on the at least one update version.

18. The method of claim 17, further comprising:

updating the at least one determined update version in response to reception of a signal indicating completion of the update from the second external device; and updating the generated update list based on the at least one updated update version.

19. The method of claim 13, further comprising:

transmitting update information corresponding to the received information to the second external device in response to reception of information on a version for updating the second external device from the first external device, wherein the second external device is an electronic device updated based on the transmitted update information.

20. The method of claim 19, wherein the information on the version for updating the second external device includes information on a time point at which the second external device is updated, the method further comprising transmitting update information corresponding to the received information to the second external device at the time point.

* * * * *